(12) United States Patent
Barsness et al.

(10) Patent No.: US 7,979,399 B2
(45) Date of Patent: *Jul. 12, 2011

(54) DATABASE JOURNALING IN A MULTI-NODE ENVIRONMENT

(75) Inventors: Eric Lawrence Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/136,222

(22) Filed: Jun. 10, 2008

(65) Prior Publication Data

US 2009/0307290 A1 Dec. 10, 2009

(51) Int. Cl.
*G06F 7/00* (2006.01)
*G06F 17/00* (2006.01)
(52) U.S. Cl. .................. 707/662; 707/663; 707/664
(58) Field of Classification Search .................. None
See application file for complete search history.

(56) References Cited

U.S. PATENT DOCUMENTS 5,684,986 A * 11/1997 Moertl et al. ................... 1/1
7,296,135 B2 * 11/2007 Thompson .................. 711/201
2002/0091975 A1 * 7/2002 Redlich et al. ............... 714/699
2006/0285648 A1 * 12/2006 Wahl et al. ................... 379/1.01
2007/0288526 A1 * 12/2007 Mankad et al. .............. 707/200
2008/0091308 A1 * 4/2008 Henson et al. ............... 700/293

OTHER PUBLICATIONS

"Survivable Information Storage Systems" published by Jay Wylie et al. in the COMPUTER magazine, Aug. 2000, pp. 61-67.*
Eric L. Barsness, et al., U.S. Patent Application Entitled, "Database Journaling in a Multi-Node Environment,", now U.S. Appl. No. 12/136,234, filed Jun. 10, 2008.
Office Action from U.S. Appl. No. 12/136,234, dated Sep. 9, 2010.

\* cited by examiner

*Primary Examiner* — Susan Y Chen
(74) *Attorney, Agent, or Firm* — Patterson & Sheridan, LLP

(57) ABSTRACT

A database spread over multiple nodes allows each node to store a journal recording changes made to the database and also allows a journaling component to manage the memory space available for journaling. Two threshold size values may be specified for the journal. The first threshold value specifies a journal size at which to being pruning the journal on a given node. A journal pruning algorithm may be used to identify journal entries that may be removed. For example, once a given transaction completes (i.e., commits) the journal entries related to that transaction may be pruned from the journal. The second threshold value specifies the maximum size of the journal. After reaching this size, journal entries may be written to disk instead of the in-memory journal.

20 Claims, 8 Drawing Sheets

DATABASE JOURNALING IN A MULTI-NODE ENVIRONMENT

BACKGROUND OF THE INVENTION

1. Field of the Invention

Embodiments of the invention generally relate to improving the efficiency of database operations on a distributed database. More specifically, embodiments of the invention relate to using journaling in a multi-node environment to improve performance of a distributed database.

2. Description of the Related Art

A database management system (DBMS) provides a system configured to create, query, and manage databases, which in turn may include tables, rows, columns, and defined relationships between these elements. One feature commonly provided by database systems is referred to as a "journal" or "log." As is known, a journal is a file used to store changes to the database. The journal provides a record of transactions that operate on the database, such as additions, updates, and deletions to the information contained in the database. Each transaction performed may generate a corresponding set of entries in the journal. One known use of journaling in a database application environment is commitment control. In database terminology, the journal is used to ensure that transactions are "atomic," which means that either each step of a given transaction should be successfully performed or no steps should be performed. The journal provides a record of changes that can be rolled back when a given transaction does not occur successfully. That is, the journal allows a database engine to undo changes made during runtime when a transaction fails to be completed. The database engine can reconstruct the database state prior to the transaction using the information from the journal entry related to the transaction.

However, journals consume system resources that can adversely impact the performance of the DBMS as well as applications that share resources with the DBMS. For example, as transactions operate on the database, the journal must be updated with entries that include the changes made in these transactions. Further, journals require space in memory or disk. Thus, maintaining a journal requires both memory and processing resources, which can reduce overall system performance. Typically, however, the drain on resources is more than overcome by ensuring the integrity of transactions that operate on the database and the ability to undo changes that using a journal provides. Further, in many conventional DBMS systems, the journal simply consumes relatively inexpensive space on disk.

In large distributed systems, however, a large number of individual processing nodes may each provide a limited amount of memory used to store a portion of a database. Because any memory used for overhead reduces the volume of data that may be stored on a node in an in-memory database, it is important to maximize the amount of available memory, and to minimize the overhead of supporting structures like journals. Having an inefficient method for managing the memory space of the journals is detrimental to database efficiency in general and to an in-memory database in particular. Currently, relational database management systems create a new journal file when the old journal file is full or, in database terminology, cause a journal switch when a current journal file reaches a threshold size. This approach is inadequate in a massively parallel database environment because disk access is relatively expensive. Similarly, just not using or maintaining a journal is unreasonable, as all nodes storing a portion of the database may benefit from each having a record of transactions that affect the database portion stored on that node.

SUMMARY OF THE INVENTION

One embodiment of the invention includes a method for managing journal size on a first compute node storing a portion of an in-memory database distributed across a plurality of compute nodes. The method may generally, include while executing a first database operation on the first compute node, generating one or more journal entries reflecting the performance of the first database operation and writing the one or more entries to a journal of database operations performed on the first compute node. The journal of database operations is stored in a memory associated with the first compute node. Upon determining a size of the journal has exceeded a first specified threshold size, one or more pruneable entries of the journal may be identified and pruned from the journal.

Another embodiment of the invention includes a computer-readable storage medium containing a program which, when executed, performs an operation managing journal size on a first compute node storing a portion of an in-memory database distributed across a plurality of compute nodes. The operation may generally include while executing a first database operation on the first compute node, generating one or more journal entries reflecting the performance of the first database operation and writing the one or more entries to a journal of database operations performed on the first compute node. The journal of database operations is stored in a memory associated with the first compute node. Upon determining a size of the journal has exceeded a first specified threshold size, one or more pruneable entries of the journal may be identified and pruned from the journal.

Still another embodiment of the invention includes a parallel computing system. The system may generally include a plurality of compute nodes, each having at least a processor and a memory. The memory on each respective compute node may store a portion of an in-memory database and a journal of database operations performed on the compute node. The journal on each respective compute node is associated with a first threshold size and a second threshold size. The system may also include a database application configured to manage journal size on the compute node. The database application may be configured to generate one or more journal entries reflecting the performance of the first database operation while executing a first database operation on the compute node and write writing the one or more entries to the journal of database operations performed on the compute node. Upon determining a size of the journal has exceeded a first specified threshold size, one or more pruneable entries of the journal may be identified and pruned from the journal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
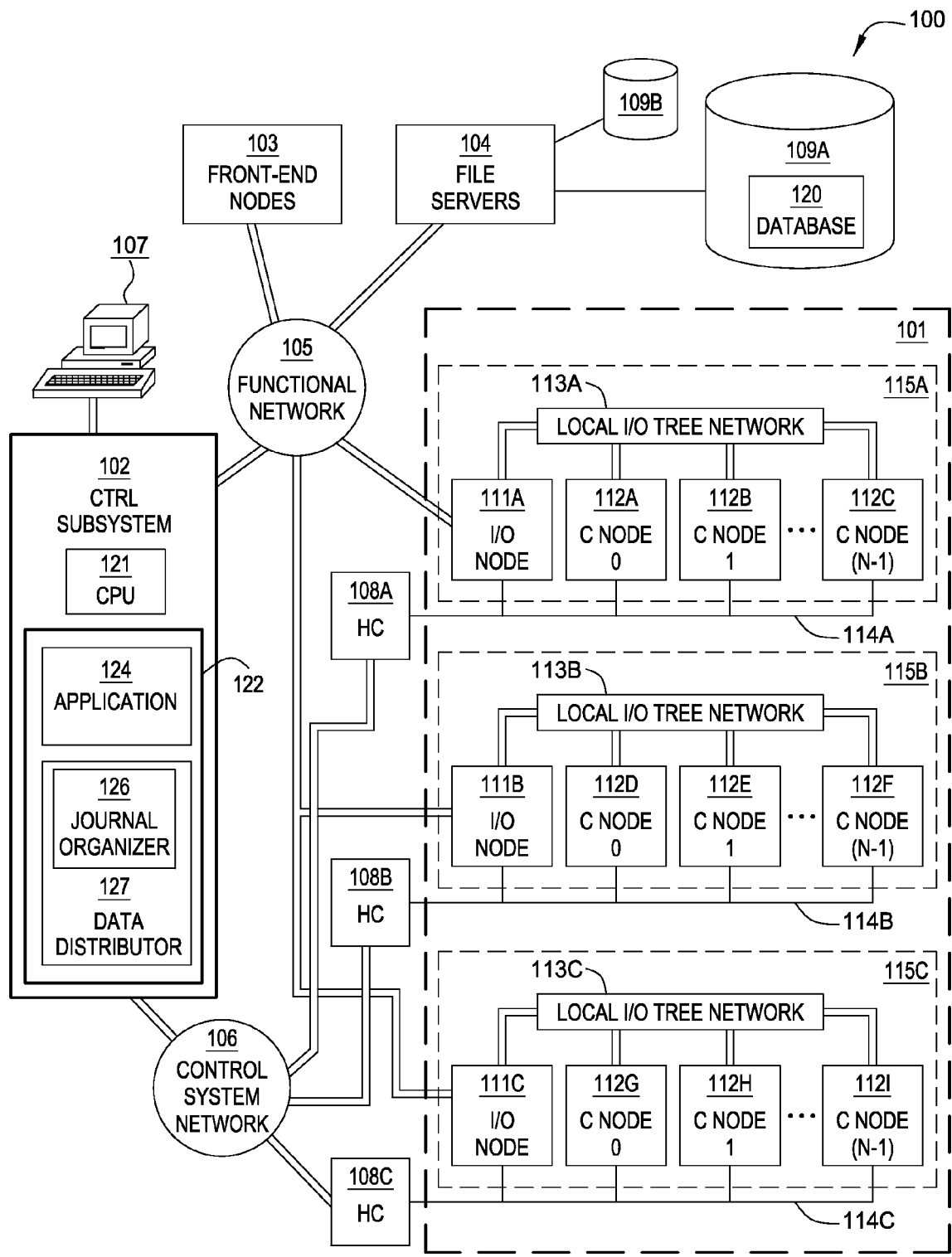
FIG. 1 is a diagram of components of a parallel computing system, according to one embodiment of the present invention.

Embodiments of the invention enable a database spread over multiple nodes to allow each node to store a journal recording changes made to the database and also enable a journaling component to manage the memory space available for journaling. In one embodiment, when the database is distributed across the compute nodes of a multi-node or distributed system, each compute node maintains a journal of operations performed on that node. Further, two threshold size values may be specified for the journal. The first threshold value specifies a journal size at which to being pruning the journal on a given node. A journal pruning algorithm may be used to identify journal entries that may be removed. For example, once a given transaction completes (i.e., commits) the journal entries related to that transaction may be pruned from the journal. In one embodiment, the pruning algorithm may be performed when free processing cycles are available. That is, the pruning algorithm may be configured to execute when the database engine is not actively performing other database transactions. The second threshold value specifies the maximum size of the journal. After reaching this size, journal entries may be deposited to disk instead of the in-memory journal. Further, in one embodiment, entries pruned from the journal may simply be discarded. Alternatively, entries pruned from the journal may be written to disk at times when doing so does not adversely impact database performance.

Further, in one embodiment, historical statistics may be captured and used to improve the management of the memory available for journaling on a given node. For example, if a specific type of transaction is rarely rolled back, the journal entries associated with such a transaction may be written to disk at any time and the memory space used by such journal entries may be marked for reuse by the journaling component. For the infrequent occasions that such a transaction is rolled back, the relevant journal entries may be retrieved from disk. Also, journal entries may be compressed based on whether the data being written to the journal is already known to compress effectively. This may occur in instances where data was compressed in the actual file prior to processing. Likewise, journal entries may be compressed when it is unlikely that the data written to the journal would need to accessed for a rollback operation, e.g., if the percentage of times a given transaction type is successfully committed is above a specified threshold.

Further still, in one embodiment, the journaling component may use information obtained from the database to improve the efficiency of journaling in a multi-node environment. This may include synchronizing journal pruning on all or a subset of the compute nodes. For example, the pruning of journal entries may be synchronized across each node involved in a transaction, such that if one node involved in the transaction prunes entries from its journal then all nodes may prune entries related to that transaction.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram of components of parallel computing system 100, according to one embodiment of the present invention. Illustratively, computer system 100 illustrates the high-level architecture of an IBM Blue Gene® computer system, it being understood that other parallel computer systems may be used (e.g., a Beowulf (or other) computing cluster, a grid computing system, and the like), and the description of an embodiment herein is not intended to limit the present invention.

As shown, computer system 100 includes a compute core 101 having a number of compute nodes arranged in a regular array or matrix, which perform the useful work performed by system 100. The operation of computer system 100 and compute core 101 may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

In one embodiment, the disk based storage 109 may contain a database 120. In operation, the database 120 may be moved from the disk-based storage and spread across the nodes of compute core 101. Additionally, as described in greater detail herein, each compute node storing a portion of the database may maintain a journal recording database operations performed on that compute node. Further, once the journal on a given node reaches a first threshold size, the DBMS executing on that node may take steps to prune certain entries from the journal, or otherwise reduce the size of the journal (e.g., by compressing some entries). Further, the DBMS may share information about certain transactions or journal entries allowing other nodes to prune entries from a corresponding journal on another node.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105. In this way, the journaling component may have journal entries written to disk based storage 109.

Control subsystem 102 may be configured to direct the operation of the compute nodes 112 in compute core 101. In one embodiment, control subsystem 102 is a computer that includes a processor (or processors) 121, internal memory 122, local storage 125, database distributor 127, and journal organizer 126. An attached console 107 may be used by a system administrator or similar person. Control subsystem 102 may also include an internal database which maintains state information for the compute nodes in core 101, and an application 124 which may be configured to, among other things, control the allocation of hardware in compute core 101, direct the loading of data on compute nodes 112, and perform diagnostic and maintenance functions.

As stated, in one embodiment, the compute nodes of a parallel computing system may be used to store an in-memory database. Because parallel computing systems typically have a large number of compute nodes, a large in-memory database may be stored by a parallel computing system. Further, the processing speed of large parallel computing system, along with the data access times for an in-memory database, may provide a very efficient computing environment for accessing the in-memory database. However, prior to any database operations being performed, the parallel computing system needs to decide how to distribute the database 120 across the nodes. That is, the system needs to determine a configuration for an in-memory database on the compute nodes of the parallel computing system.

In one embodiment, the database distributor 127 may distribute data from database 120 across compute nodes 112 based on a calculus for efficient performance of jobs running against the database 120. A database may organize data within data tables, consisting of rows, and columns (a.k.a. records and fields). The database distributor 127 may distribute data from a single database table across many compute nodes 112 depending on space and performance requirements.

In one embodiment, the journal organizer 126 may monitor database and performance and journaling usage such that the database distributor 127 may modify what journal entries are pruned from one or more nodes (i.e., optimizing the journaling data based on the data distribution) or modify the how data is distributed across the nodes (i.e. optimizing the data distribution based on the available journaling data). Of course, which action is performed may be selected to suit the needs in a particular case.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
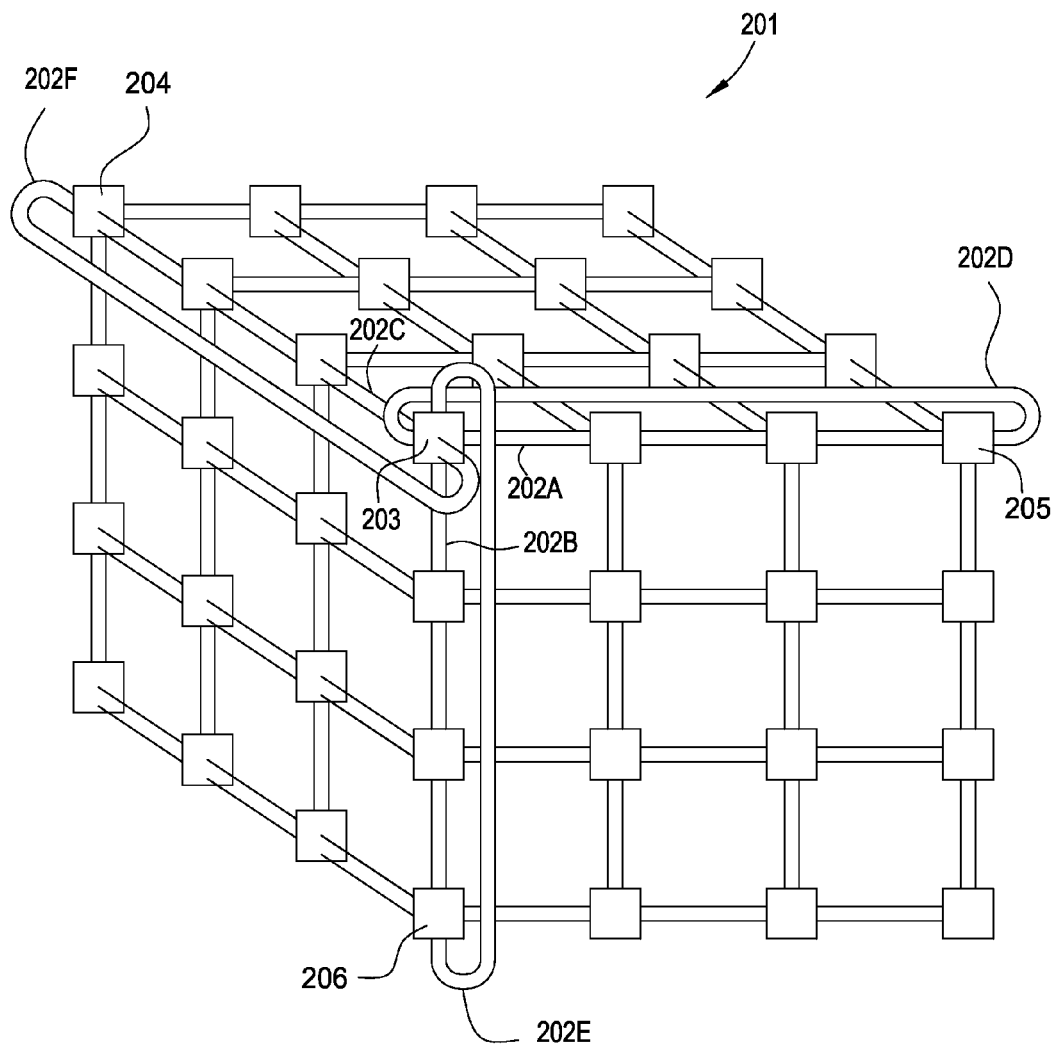
FIG. 2 is an illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 contiguous nodes, it will be understood that the actual number of compute nodes in a parallel computing system is typically much larger. For example, a complete Blue Gene®/L system may include as many as 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions. Torus 201 is also representative of a block formed from 64 contiguous compute nodes. That is, torus 201 may be a subset of compute nodes from compute core 101 used to form a block and to execute a particular computing task.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. As shown, for example, links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
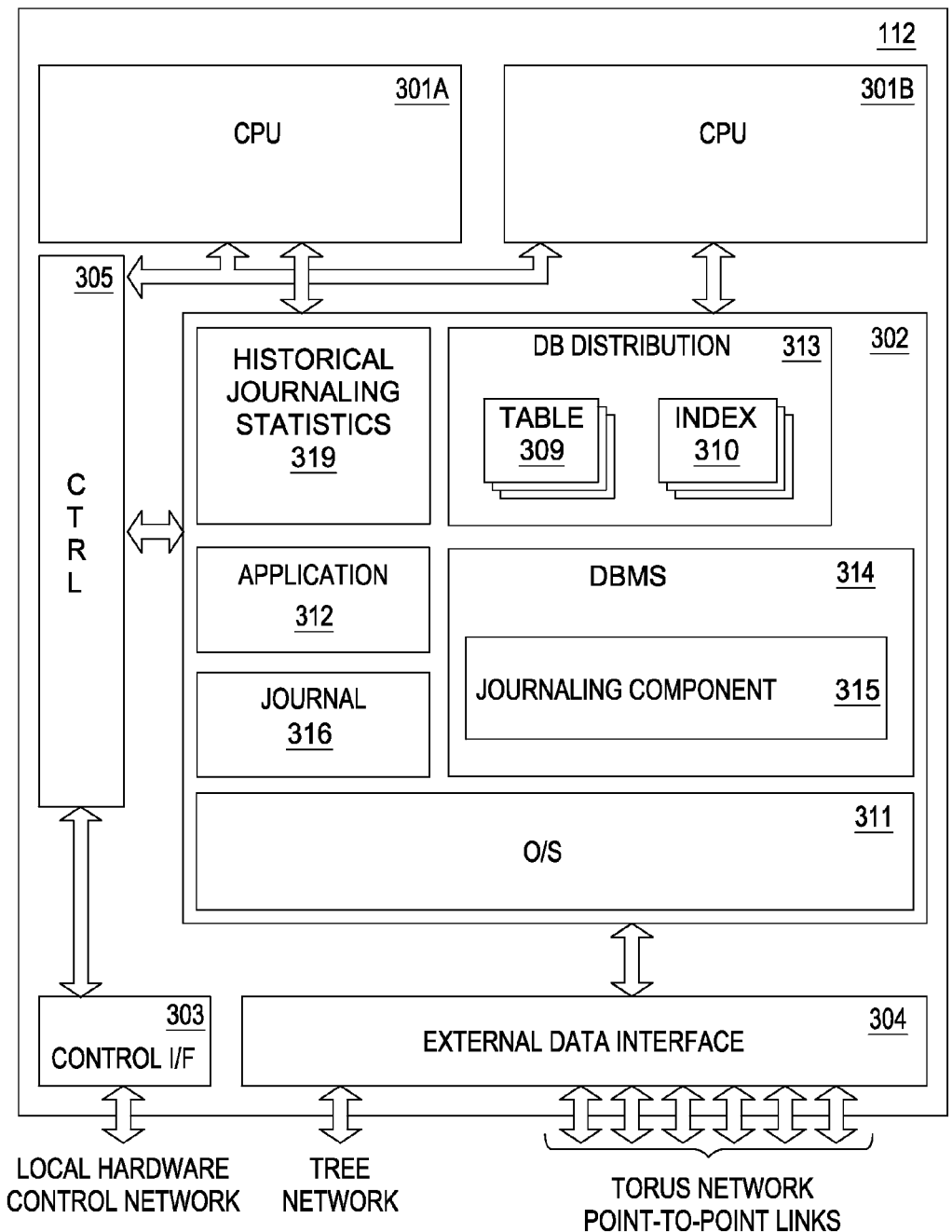
FIG. 3 is a diagram illustrating an example of a compute node of a parallel computing system, according to one embodiment of the invention.

FIG. 3 is a diagram illustrating an example of a compute node 112 of a parallel computing system, according to one embodiment of the invention. Specifically, the compute node shown in FIG. 3 is representative of a compute node on a Blue Gene®/L computer system. Of course, embodiments of the invention may be adapted for use with other distributed architectures, grids, clusters, etc. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application 312, a database management system (DBMS) 314, a database distribution 313, a journal 316, journaling component 315, and historical journaling statistics 319 as required. Operating system image 311 provides a copy of a simplified-function operating system running on compute node 112. Operating system image 311 may include a minimal set of functions required to support operation of the compute node 112.

Application code image 312 represents a copy of the application code being executed by compute node 112. Application code image 312 may include a copy of a computer program submitted for execution on system 100. In one embodiment, a group of compute nodes may be assigned to a block, where each 7node in the block executes the same application code image 312. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed within a reasonable time.

As part of executing a job, application 312 may be configured to transmit messages from compute node 112 to other compute nodes assigned to a given block. For example, the high level MPI call of MPI_Send( ); may be used by application 312 to transmit a message from one compute node to another. On the other side of the communication, the receiving node may call use the MPI call MPI_Recieve( ); to receive and process the message. In a Blue Gene® system, the external data interface 304 may be configured to transmit the high level MPI message by encapsulating it within a set of packets and transmitting the packets of over the torus network of point-to-point links. Other parallel systems may provide mechanisms for transmitting messages between different compute nodes. For example, nodes in a Beowulf cluster may communicate using a using a high-speed Ethernet style network. Similarly, large distributed or grid-type systems use message passing techniques to coordinate the processing activity of a block of compute nodes.

DBMS 314 may be configured to perform database functions related to the database distribution 313 stored on compute node 112. The DBMS 314 may perform such functions in response to requests received from the application 312 to access and update data within tables 309. For example, consider a transaction submitted to change certain database records from a database table distributed across many compute nodes. In such a case, message passing techniques may be used to distribute the transaction request to each compute node 112 that contains a portion of the table. And in response, each such compute node 112 executes the transaction to identify and change any records stored on that node as specified in the request.

As part of ongoing operations, application 312 may submit database requests to the DBMS 314. Alternatively, the database requests (e.g., query or insert operations) may be submitted to the in-memory database stored on the compute core 101. In such a case, queries may be broadcast to the compute core 101 and the DBMS 314 running on each compute node 112 performs the operations specified in the request to determine whether any database records on that compute node 112 are relevant to the request and then performs the requested operation accordingly. In either case, the journal 316 may be configured to store entries related to the database operations preformed on each respective compute node 112.

The database distribution 313 represents the portion of a larger database distributed to a particular compute node 112. In addition, a corresponding set of journaling data, such as journal entries, may be stored in journal 316. As stated, in one embodiment, journal 316 may be initialized or created empty. Alternatively, journaling data, such as journal entries, for journal 316 may be distributed as part of database distribution 313. Further, in one embodiment, the journaling component 315 may use historical journal statistics 319 which record database performance and journal use to identify what journal entries may be pruned from the journal 316 on compute node 112 once the journal reaches a specified size.

Once a database is distributed across a group of compute nodes 112, the DBMS may respond to requests to perform database transactions. Further, while doing so, the journaling component 315 may record a log of each transaction performed in journal 316. Thus, over time as transactions occur and entries are added to the journal 316, the size of the journal may continue to grow. In a conventional database system, where journal entries are stored on inexpensive (and pragmatically unlimited) disk space, this result may not present a problem. However, in a distributed in-memory database which provides a fixed amount of memory available for the operating system image 311, the DMBS 314, any application programs 312, and the journal 316, the size of the journal 316 may begin to impact performance on compute node 112. It is therefore important to manage the journal 316 and, when necessary, select journal entries to be pruned. In one embodiment, a journal entry may be pruned by discarding certain entries completely or alternatively, by having pruned journal entries written to disk storage in database 120.

Illustratively, the DBMS 314 includes a journaling component 315 configured to manage the memory space consumed by the journal. In one embodiment, the journaling component 315 may use two threshold values for the journal. The first threshold value may be used to determine when to begin pruning the journal 316. Once the journal 316 reaches the specified threshold size, journaling component 315 may be configured to prune journal entries to reduce the memory requirements of the journal 316. In one embodiment, the journaling components 315 may execute when free processing cycles are available on DBMS 314, e.g., during periods while the DMBS 314 is not actively performing a database transaction. The second threshold value may be used to determine the maximum amount of memory the journal 316 may consume. After reaching the second threshold value, entries from journal 316 may be written to disk storage in database 120 instead of the journal 316 in memory 302.

Further, in some embodiments, journaling component 315 may track historical journaling statistics 319 regarding database transactions performed by DBMS 314 on compute node 112. Such information may also be provided to journal organizer 126. In one embodiment, historical journaling statistics 319 may be used to evaluate whether to prune certain entries from the journal 316. For example, the journaling component 315 may prune journal entries that the historical journaling statistics 319 indicate are associated with database transactions rarely rolled back. That is, entries in the journal are used so infrequently that a cost to maintain such journal entries outweighs the benefit of keeping the journal entry in the journal 316. Further, the journaling component 315 may use historical journaling statistics 319 to determine whether to compress certain journal entries in memory 302. For example, journal entries may be compressed when it is unlikely that the journal entries will need to be uncompressed as part of a rollback operation. Similarly, the journaling organizer 126 may receive journaling statistics from each compute node 112 storing a portion of the in-memory database, providing a more global view of journaling effectiveness and allowing the journaling organizer 126 to identify journal entries pruned on one node that may be pruned on another node.

Figure 4:
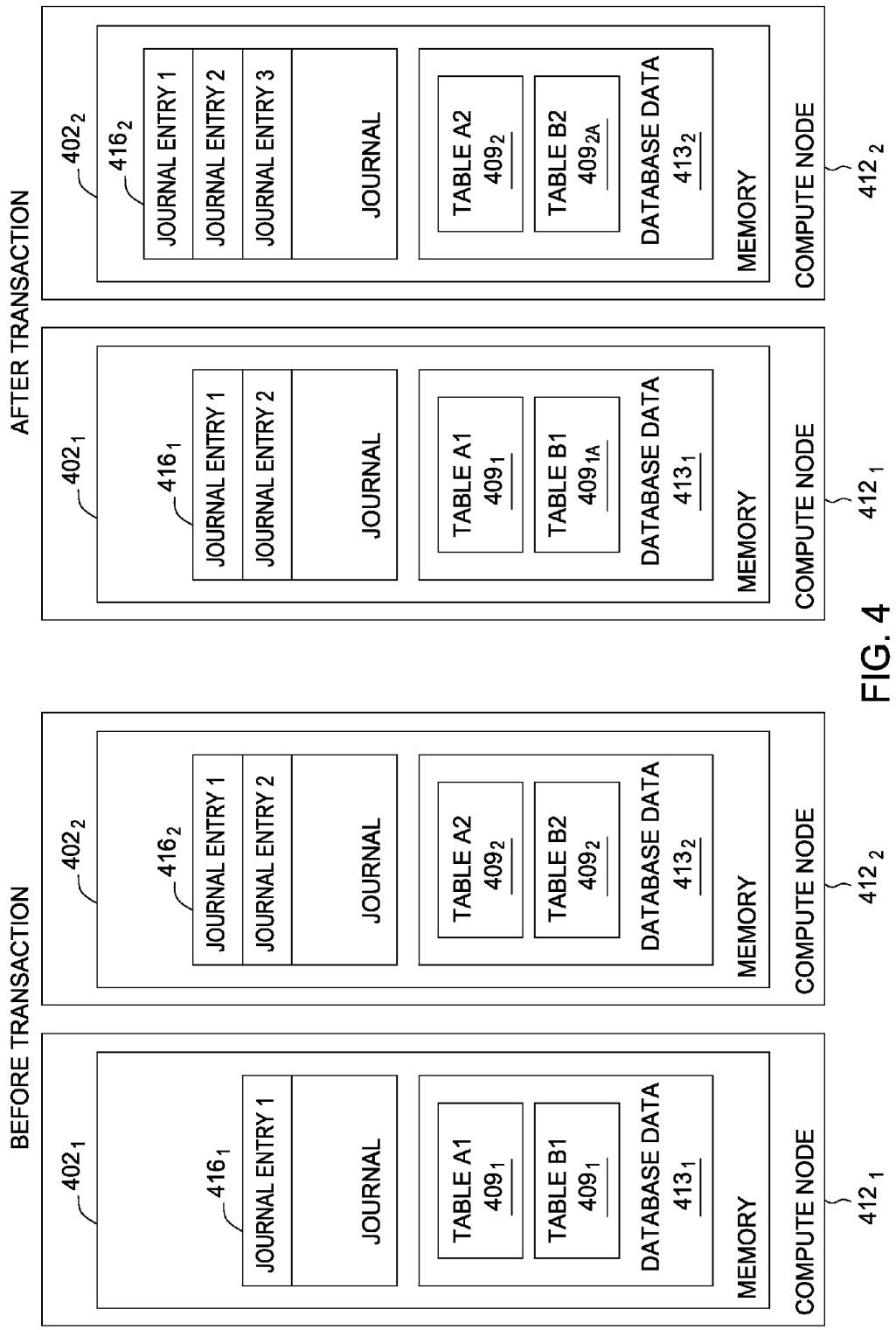
FIG. 4 illustrates an example of a database transaction performed on two compute nodes of a parallel system, according to one embodiment of the invention.

For example, FIG. 4 illustrates an example transaction performed on a database distributed across two compute nodes $412_{1, 2}$ of a parallel system, according to one embodiment of the invention. Of course, the use of two compute nodes is done to highlight aspects of the invention, and in practice an in-memory database may span thousands, or even tens-of-thousands, of compute nodes. The view of the nodes $412_{1, 2}$ before and after a transaction is done to further highlight the aspects of the invention. As shown, node $412_1$ includes a first distribution $413_1$ of database data and node $412_2$ includes a second distribution $413_2$ of database data, each stored within a respective memory $402_{1, 2}$. In this example, distributions $413_{1, 2}$ each contain a different portion of tables A and B, labeled in FIG. 4 as tables A1, A2, and B1, B2, respectively. On compute node $412_1$, a journal $416_1$ provides journal entries for the portion of data stored in table A1 and table B1. Similarly, on compute node $412_2$, a journal $416_2$ provides journal entries for the portion of data stored in table A2 and table B2. Note, each node maintains its own journal and journal entries. That is, each node works independently in its journaling. The journal entries of each node $412_{1,2}$ depend on the transaction involving that node. For example, assume database table B1 stores employee name and department information of all employees from department X. Further, assume database table B2 stores employee name and department information of all employees from department Y. Now, assume a transaction occurs resulting one employee changing from department X to department Y. In such a case, both of nodes $416_{1,2}$ are involved in this transaction. Further, the transaction results in a journal entry in journal $416_1$ of compute node $412_1$ and a journal entry in journal $416_2$ of compute node $412_2$. Accordingly, as illustrated in FIG. 4, the journal $416_{1, 2}$ shown in the "after transaction" includes additional entries not shown in the "before transaction."

In one embodiment, a service node may record transactions occurring on all the nodes. For example, each compute node may transmit a copy of journal entries to one or more service nodes. In one embodiment, the service nodes may be nodes of the compute core 101 dedicated to process such entries. Alternatively, the service nodes may be an auxiliary system connected to the compute core (e.g., service node 102). Such nodes may be used as a back up in the event of a catastrophic failure, such as loss of power, of a compute node and thereby improve the integrity of the database throughout the distributed environment. For example, in one embodiment, if compute node $412_1$ experienced a loss of power which erased its memory, the journaling component (or other software component) of compute node $412_1$ may contact the journaling component to rebuild the database data lost using information obtained from the service nodes.

In one embodiment, the service node (or nodes) may evaluate information received from individual compute nodes regarding what entries are entered into a given journal as well as what entries have been pruned. Further, the service node may evaluate the entries received from multiple compute nodes to identify entries which, when pruned on one, may also be pruned on another, or which when created on one node, need not be created on others. For example, some journal entries are written to signify that an object has changed (e.g., a record being marked as "dirty"). An entry reflecting such an event may not need to be recorded in more than one place. Thus, by having a service node share this information with other nodes, such nodes may determine to not store certain journaling data in a corresponding journal. Similarly, a journal entry might provide a before and an after image of a file accessed by the database. In such a case, once the before and after images are stored by one journal, there may not be a need to duplicate this journal entry on other nodes.

Figure 5:
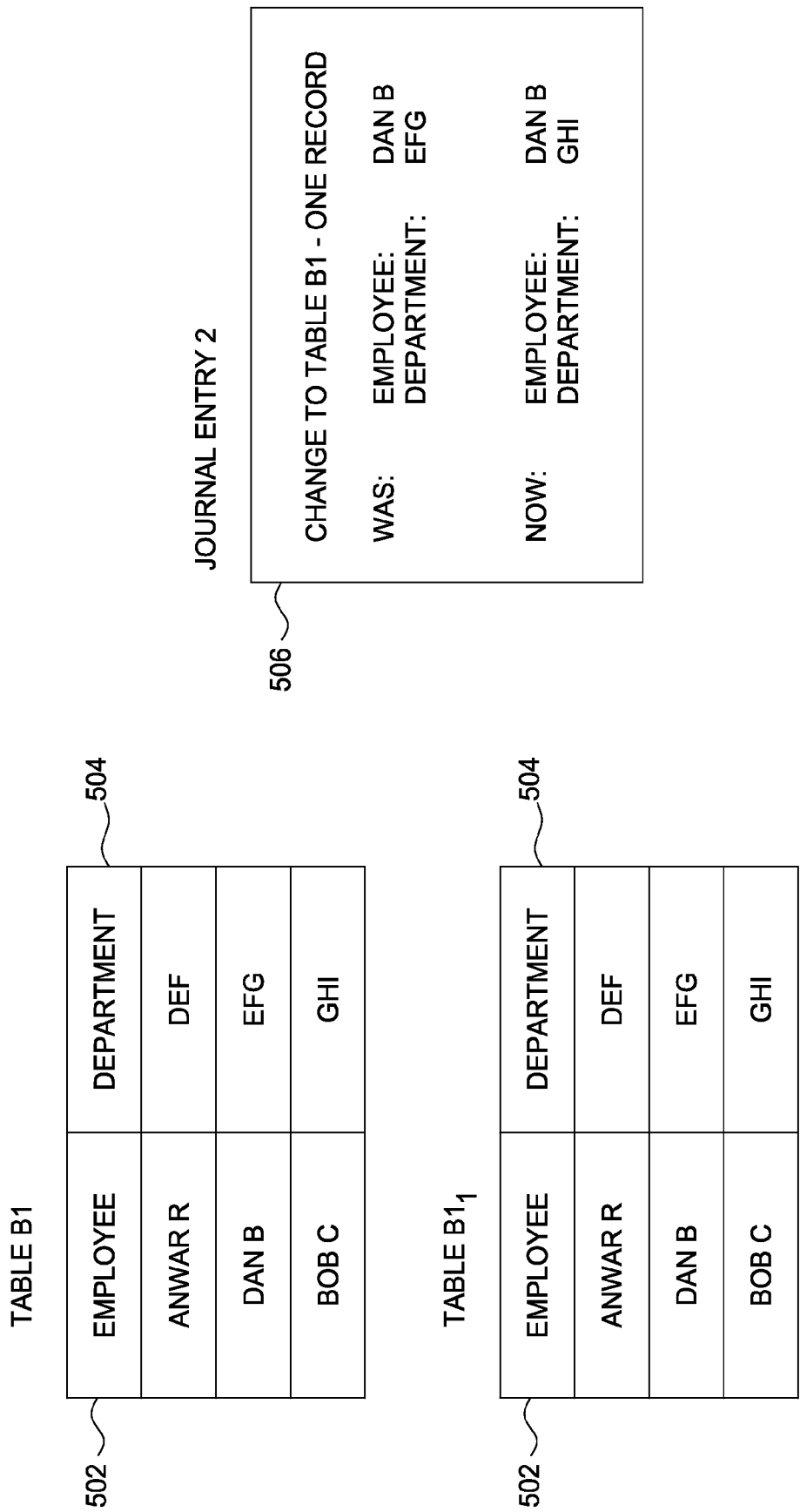
FIG. 5 illustrates an example of a journal entry of a transaction in an example table of an in-memory database, according to one embodiment of the invention.

FIG. 5 illustrates an example of a journal entry 506 of a transaction in an example table 502 of an in-memory database, according to one embodiment of the invention. As shown, the example table 502 is a portion of distributed Table B and is labeled Table B1 before the transaction occurs and labeled Table $B1_1$ after the transaction has operated on the table data. The journal entry 506 is labeled Journal Entry 2. In this example, Journal Entry 2 records the changes made by the transaction by storing a before and after image of the changed data.

Figure 6:
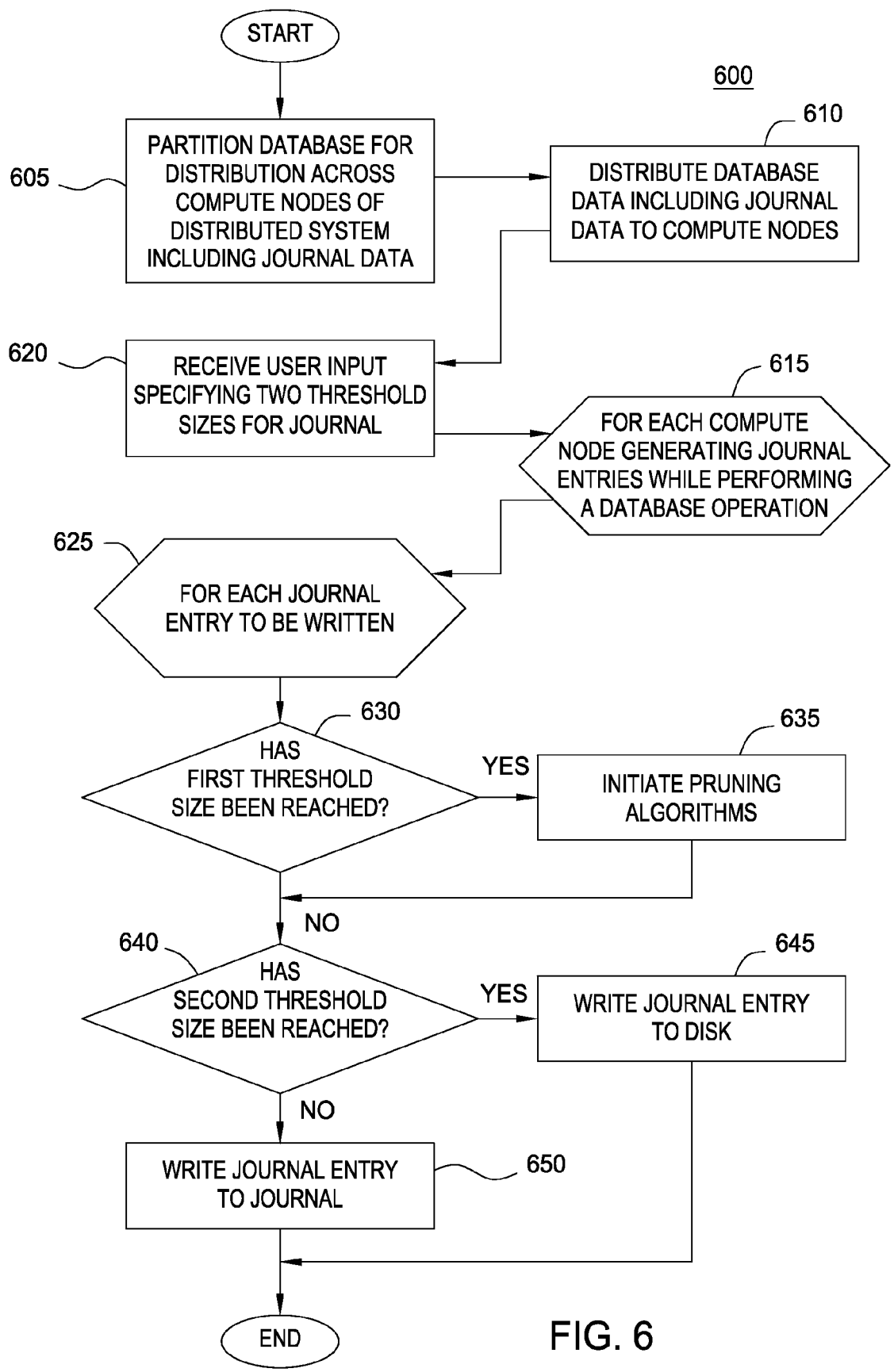
FIG. 6 is a flow diagram illustrating a method 600 for maintaining a journal in an in-memory database on a multi-nodal computer system, according to one embodiment of the invention.

FIG. 6 is a flow diagram illustrating a method 600 for maintaining a journal in an in-memory database on a multi-nodal computer system, according to one embodiment of the invention. As shown, the method 600 begins at step 605, where a database is portioned for distribution across the nodes of a distributed system. For example, the database may be subdivided into individual tables, or portions of tables, such that each portion fits within a memory space provided by a compute node of the distributed system. At step 610, the subdivided portions of the database are distributed to the compute nodes of the parallel system.

In one embodiment, in addition to creating an in-memory database by distributing database elements across the compute nodes of the parallel system, database journaling data, such as journal entries, may also be distributed to the compute nodes. For example, journal entries may exist when the in-memory database is saved to disk and subsequently restored. Typically, however, journal entries are created once the database is distributed and database operations have begun to occur. In this latter case, the journal on each compute node may be initialized in an "empty" state, i.e., in a state with no journal entries. At step 620, the journaling component 315, or other software component, may receive user input specifying threshold values for a journal.

At step 615, a loop begins that includes 625-650. During each pass through this loop, a journaling component on a given compute node processes journal entries generated on that node while performing database operations. As each compute node includes a separate journaling component and may perform different database operations, the size of a journal on different nodes is expected to vary.

At step 625, a loop begins that includes 630-650. During each pass through this loop, the journaling component on one of the compute nodes determines whether a journal entry should be written to the in-memory journal and whether journal pruning is necessary. In one embodiment, this may be determined relative to the two user-specified threshold values specified at step 620. At step 630, the journaling component may determine whether the journal size has reached the first threshold value. If the first threshold value has been reached, then at step 635, the journaling component may begin pruning the journal stored in the memory of that compute node. In one embodiment, the journaling component executes when free CPU processing cycles are available (e.g., when the DBMS running on that compute node is idle). As stated above, the journaling component may employ a variety of techniques to prune the journal. For example, entries related to a committed transaction may be pruned. Similarly, entries related to transactions that are infrequently rolled back may be written to disk or compressed.

At step 640, the journaling component may determine whether the journal size has reached the second threshold value. In one embodiment, the journal size used in the determination includes the size of the journal entry to be stored. If adding the new entry causes the journal to exceed the second threshold size, at step 645, the journaling component may have journal entries written to disk based storage. Conversely, if the journal has space available to store the journal entry, the journaling component stores the journal entry in the journal of the current node. After step 650, the method 600 returns to step 625 where the journaling component evaluates another journal entry. After processing the journal entries created for a given transaction, the method returns to step 615, where further entries are generated as part of ongoing database operations.

Figure 7:
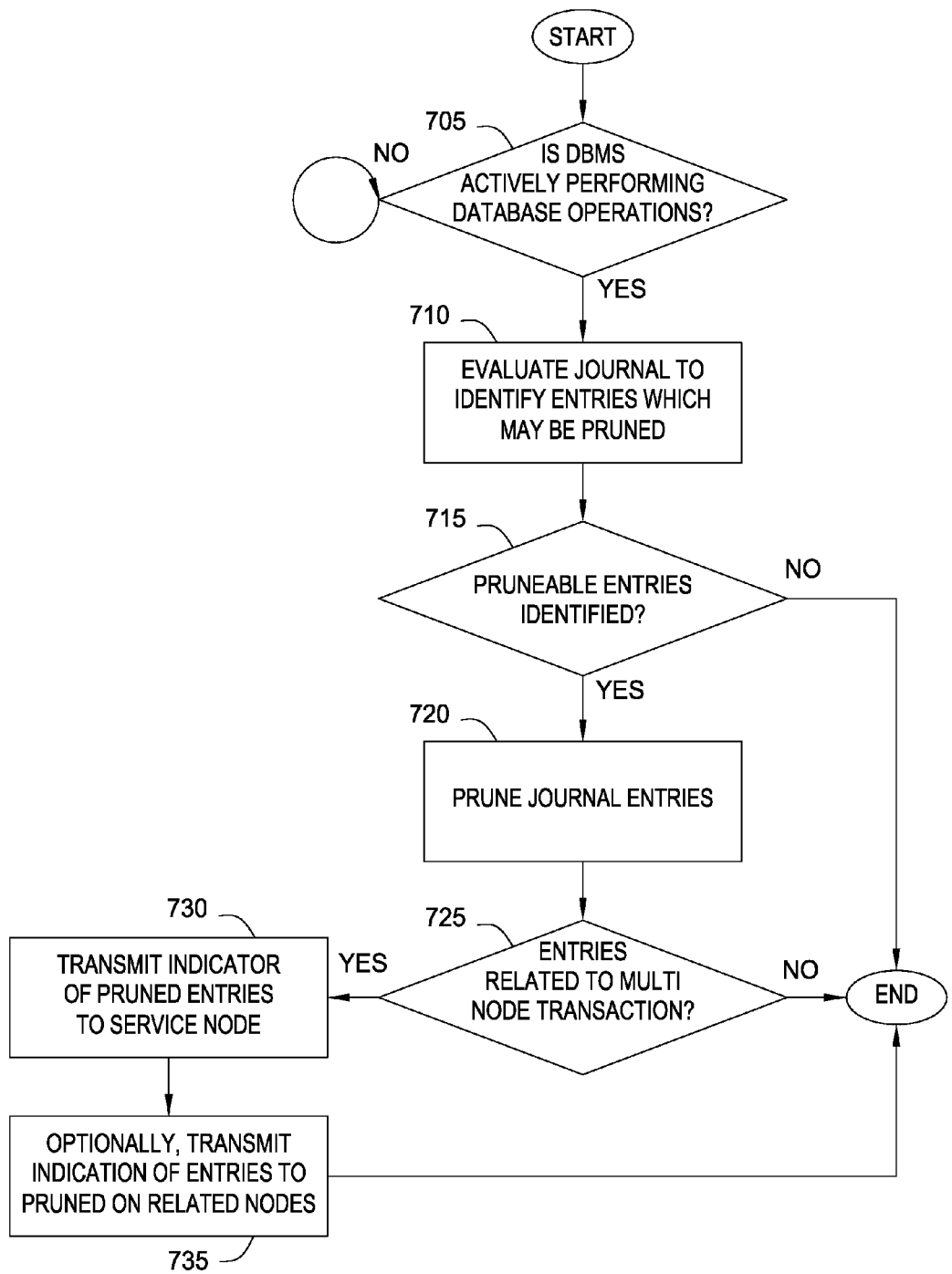
FIG. 7 is a flow diagram illustrating a method for improving the efficiency of journal maintenance on a distributed database, according to one embodiment of the invention.

FIG. 7 is a flow diagram illustrating a method 700 for improving the efficiency of journaling on a distributed database, according to one embodiment of the invention. The method 700 may be performed by each compute node that stores a portion of an in-memory database and a journal of database operations performed on that node.

As shown, the method 700 begins at step 705 where the journaling component determines whether a DBMS is actively performing any database operations. If not, the journaling component may be configured to wait for a period of DBMS inactivity before beginning pruning operations. Otherwise, at step 710, the journaling component may evaluate the journal on this compute node to identify entries in the journal which may be pruned. An example of the evaluation performed at step 710 is further described in reference to FIG. 8. At step 715, if no "pruneable" entries are identified, then method 700 terminates. Otherwise, at step 720, the journaling component may prune the journal entries identified at step 710. As stated above, in one embodiment, the journaling component may delete "pruneable" entries from the journal. Alternatively, the entries may be written to a disk based archive.

At step 725, the journaling component may determine whether the entries pruned from the journal relate to a multi-node transaction or whether the pruned entries may be duplicated on other compute nodes (e.g., in the case of an object marked dirty, or a before/after image of a file). If not, the method 700 terminates. Otherwise, at step 730, the journaling component may transmit an indication of pruned entries to a service node. And at step 735, the service node may evaluate such entries and, as appropriate, share information with other compute nodes about entries that may be pruned.

Figure 8:
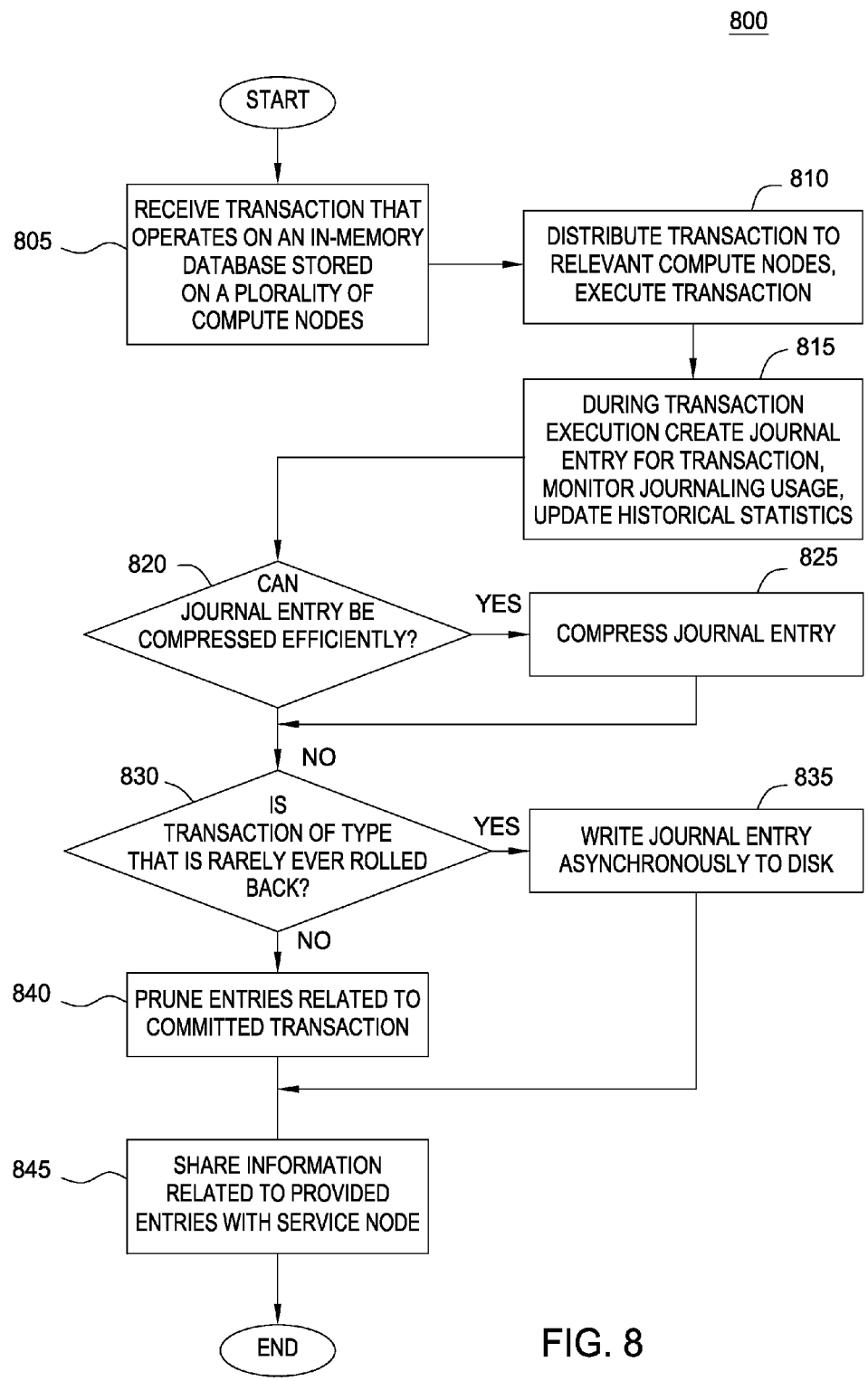
FIG. 8 is a flow diagram illustrating a method for managing the memory space used by journaling on a distributed database, according to one embodiment of the invention.

FIG. 8 is a flow diagram illustrating a method 800 for managing the memory space used by a journal on a distributed database, according to one embodiment of the invention. More specifically, method 800 illustrates examples of techniques for a journaling component to prune selected entries from a journal maintained by a compute node of an in-memory database. As shown, the method 800 begins at step 805 where a database application receives a transaction request directed to an in-memory database. In one embodiment, for example, one or more compute nodes of a parallel system may be running a database application used to manage database data stored by the parallel system. Alternatively, the in-memory database may be managed using a front-end or other management system in communication with a group of compute nodes.

At step 810, the application may distribute the transaction request to the compute nodes storing the in-memory database which in turn, execute the transaction request against the data on each respective compute node. In one embodiment, the application may broadcast the transaction request to each compute node, regardless of whether any given node includes database data responsive to the transaction request. In such a case, each compute node evaluates the transaction request and determines how to respond. Alternatively, the application may store information indicating which tables of the database (or portions of tables) have been distributed to which nodes of the in-memory database. In such a case, the application may distribute the transaction request to only the set of compute nodes referenced by the query. At step 815, while executing a transaction, the availability and use of any journal entries on a given compute node is monitored and historical journaling statistics are updated. Also, a journal entry for each step of a transaction may be generated, such that the transaction may be rolled back if not completed. For example, a journal entry may include an image of the data before the transaction so that the data can be reverted back to before the changes caused by the transaction. Once a transaction is completed, the transaction may be "committed," and an entry reflecting the completed transaction (i.e., the commit) may be added to the journal.

As described above, once the journal reaches a specified threshold size, the journaling component may begin to take steps to prune certain entries or to otherwise reduce the size of the journal. For example, at step 820, the journaling component on a given compute node may evaluate the historical journaling statistics to determine whether a group of journal entries may be compressed efficiently. This approach may be appropriate for a collection of entries related to a transaction that is only infrequently rolled-back. In such a case, it may be more efficient to compress such entries to increase the memory available for database transactions. If so, at step 825, the journal entries may be compressed. At step 735 and 740, if a transaction is of a type where it may not be advantageous to store the corresponding journal entries in memory, then the journaling component may have the journal entry written to disk storage. Like the example regarding compressed entries, transactions that are unlikely to be rolled-back may be a candidate for being written to disk storage. In one embodiment, the journaling component may have the journal entry written asynchronously to disk storage. At step 840, the journaling component may identify and prune journal entries related to a committed transaction. As stated, entries related to a committed transaction may be deleted from the journal or be written to disk storage. In either case, pruning these entries from the journal increases the memory available for database transactions.

Further, in one embodiment, the journaling component on one compute node may share data related to pruned entries with a service node (step 845). In such a case, the service node may evaluate the data to identify whether entries may be pruned on other nodes. For example, if one node commits a transaction that included steps performed on multiple nodes, the service node may inform each node involved in the transaction that it has been completed, allowing each node to prune the corresponding journal entries. Similarly, some journal entries may not need to be created more than once. This may occur, for example, when a journal entry indicates that an object has been modified or when an entry stores an image of an object taken before and after performing a given transaction step. In both these cases, once a journal entry reflecting the state of the object is present on one compute node, it may be unnecessary to duplicate the entry on other nodes. Thus, in such cases, the service node may inform other nodes to prune any unnecessary entries from a corresponding journal, allowing the memory space used by such entries to be reused.

Advantageously, as described herein, embodiments of the invention enable a database spread over multiple nodes to allow each node to store a journal recording changes made to the database and also enable a journaling component to manage the memory space available for journaling. Two threshold size values may be specified for the journal. The first threshold value specifies a journal size at which to being pruning the journal on a given node. A journal pruning algorithm may be used to identify journal entries that may be removed. For example, once a given transaction completes (i.e., commits) the journal entries related to that transaction may be pruned from the journal. The second threshold value specifies the maximum size of the journal. After reaching this size, journal entries may be deposited to disk instead of the in-memory journal.

While the foregoing is directed to embodiments of the present invention, other and further embodiments of the invention may be devised without departing from the basic scope thereof, and the scope thereof is determined by the claims that follow.

What is claimed is:

1. A method for managing journal size on a first compute node storing a portion of an in-memory database distributed across a plurality of compute nodes, comprising:
while executing a first database operation on the first compute node, generating one or more journal entries reflecting the performance of the first database operation;
writing the one or more entries to a journal of database operations performed on the first compute node, wherein the journal of database operations is stored in a memory associated with the first compute node and wherein the memory further stores the portion of the in-memory database distributed across the plurality of compute nodes;
upon determining a size of the journal has exceeded a first specified threshold size, identifying one or more entries to prune from the journal;
pruning the identified one or more entries from the journal;
while executing a second database operation on the first compute node, generating one or more journal entries reflecting the performance of the second database operation; and
upon determining a size of the journal has exceeded a second specified threshold size, writing the entries reflecting the performance of the second database operation to a disk-based archive.

2. The method of claim 1, wherein pruning the identified one or more entries comprises compressing the one or more entries.

3. The method of claim 1, wherein pruning the identified one or more entries comprises removing the entries from the journal.

4. The method of claim 3, further comprising, writing the one or more entries to a disk-based archive.

5. The method of claim 1, further comprising,
receiving user input specifying the first threshold size for the journal; and
receiving user input specifying the second threshold size for the journal.

6. The method of claim 1, wherein identifying the one or more entries to prune from the journal comprises identifying entries in the journal associated with a committed database transaction.

7. The method of claim 1, wherein identifying one or more entries to prune from the journal comprises evaluating journal use statistics to identify entries associated with a database transaction with a commit percentage above a specified threshold.

8. A computer-readable storage medium containing a program which, when executed, performs an operation managing journal size on a first compute node storing a portion of an in-memory database distributed across a plurality of compute nodes, the operation comprising:
while executing a first database operation on the first compute node, generating one or more journal entries reflecting the performance of the first database operation;
writing the one or more entries to a journal of database operations performed on the first compute node, wherein the journal of database operations is stored in a memory associated with the first compute node and wherein the memory further stores the portion of the in-memory database distributed across the plurality of compute nodes;
upon determining a size of the journal has exceeded a first specified threshold size, identifying one or more entries to prune from the journal;
pruning the identified one or more entries from the journal;
while executing a second database operation on the first compute node, generating one or more journal entries reflecting the performance of the second database operation; and
upon determining a size of the journal has exceeded a second specified threshold size, writing the entries reflecting the performance of the second database operation to a disk-based archive.

9. The computer-readable storage medium of claim 8, wherein pruning the identified one or more entries comprises compressing the one or more entries.

10. The computer-readable storage medium of claim 8, wherein pruning the identified one or more entries comprises removing the entries from the journal.

11. The computer-readable storage medium of claim 10, wherein the operation further comprises, writing the entries to a disk-based archive.

12. The computer-readable storage medium of claim 8, wherein the operation further comprises:
receiving user input specifying the first threshold size for the journal; and
receiving user input specifying the second threshold size for the journal.

13. The computer-readable storage medium of claim 8, wherein identifying the one or more entries to prune from the journal comprises identifying entries in the journal associated with a committed database transaction.

14. The computer-readable storage medium of claim 8, wherein identifying one or more entries to prune from the journal comprises evaluating journal use statistics to identify entries associated with a database transaction with a commit percentage above a specified threshold.

15. A parallel computing system, comprising:
a plurality of compute nodes, each having at least a processor and a memory, wherein the memory on each respective compute node stores:
(i) a portion of an in-memory database,
(ii) a journal of database operations performed on the compute node, wherein the journal on each respective compute node is associated with a first threshold size and a second threshold size, and
(iii) a database application configured to manage journal size on the compute node by performing a method, comprising:
while executing a first database operation on the compute node, generating one or more journal entries reflecting the performance of the first database operation,
writing the one or more entries to the journal of database operations performed on the compute node,
upon determining a size of the journal has exceeded the first specified threshold size, identifying one or more entries to prune from the journal,
pruning the identified one or more entries from the journal;
while executing a second database operation on the first compute node, generating one or more journal entries reflecting the performance of the second database operation; and
upon determining a size of the journal has exceeded a second specified threshold size, writing the entries reflecting the performance of the second database operation to a disk-based archive.

16. The parallel computing system of claim 15, wherein pruning the identified one or more entries comprises compressing the one or more entries.

17. The parallel computing system of claim 15, wherein pruning the identified one or more entries comprises removing the entries from the journal.

18. The parallel computing system of claim 17, further comprising, writing the entries to a disk-based archive.

19. The parallel computing system of claim 15, wherein identifying the one or more entries to prune from the journal comprises identifying entries in the journal associated with a committed database transaction.

20. The parallel computing system of claim 15, wherein identifying one or more entries to prune from the journal comprises evaluating journal use statistics to identify entries associated with a database transaction with a commit percentage above a specified threshold.

* * * * *